United States Patent [19]
Feldgajer

[11] Patent Number: 5,832,466

[45] Date of Patent: Nov. 3, 1998

[54] SYSTEM AND METHOD FOR DYNAMIC LEARNING CONTROL IN GENETICALLY ENHANCED BACK-PROPAGATION NEURAL NETWORKS

[75] Inventor: Oleg Feldgajer, Waterloo, Canada

[73] Assignee: International Neural Machines Inc., Waterloo, Canada

[21] Appl. No.: 694,414

[22] Filed: Aug. 12, 1996

[51] Int. Cl.$^6$ .............................. G06F 15/18; G06E 1/00; G06E 3/00

[52] U.S. Cl. ............................... 706/13; 706/10; 706/15; 706/25; 706/59

[58] Field of Search ................................. 395/13, 11, 21, 395/23, 24, 75

[56] References Cited

U.S. PATENT DOCUMENTS

| | | | |
|---|---|---|---|
| 5,140,530 | 8/1992 | Guha et al. | 395/13 |
| 5,214,746 | 5/1993 | Fogel et al. | 395/23 |
| 5,245,696 | 9/1993 | Stork et al. | 395/13 |

OTHER PUBLICATIONS

P. Adamidis and V. Petridis, "Co–operating Populations with Different Evolution Behaviours,"Proceedings of 1996 IEEE Int'l Conference on Evolutionary Computation, pp 188–191, May. 1996.

V. Maniezzo, "Genetic Evolution of the Topology and Weight Distribution of Neural Networks,"IEEE Transactions on Neural Networks, vol. 5, No. 1, pp. 39–53, Jan. 1994.

B. Choi and K. Bluff, "Genetic Optimisation of Control Parameters of a Neural Network, "1995 New Zealand Int'l Two–Stream Conference on Artificial Neural Networks, pp. 174–177, 1995.

*Primary Examiner*—Taric R. Hafiz
*Assistant Examiner*—Jason W. Rhodes
*Attorney, Agent, or Firm*—Neil Teitelbaum & Associates

[57] ABSTRACT

In the design and implementation of neural networks, training is determined by a series of architectural and parametric decisions. A method is disclosed that, using genetic algorithms, improves the training characteristics of a neural network. The method begins with a population and iteratively modifies one or more parameters in each generation based on the network with the best training response in the previous generation.

11 Claims, 5 Drawing Sheets

Doc No. 43-1                                                                                              Patent The evolution of the group learning rates is given below. The table shows: Soln - winning solution, Group - winning group, and Value - winning learning rate value.

Soln  Group     Value new group ranges: (0.010000,0.100000) (0.100000,1.000000)

1 0 0.100000

1 0 0.100000

1 0 0.100000 new group ranges: (0.010000,0.031623) (0.031623,0.100000)

1 1 0.100000

1 1 0.100000

1 1 0.100000 new group ranges: (0.031623,0.100000) (0.100000,0.316228)

1 0 0.031623

1 0 0.031623

1 0 0.031623 new group ranges: (0.010000,0.031623) (0.031623,0.100000)

1 0 0.010000

1 0 0.010000

1 0 0.031623 new group ranges: (0.010000,0.017783) (0.017783,0.031623)

FIG. 6

SYSTEM AND METHOD FOR DYNAMIC LEARNING CONTROL IN GENETICALLY ENHANCED BACK-PROPAGATION NEURAL NETWORKS

FIELD OF THE INVENTION

This invention relates to a method of producing neural networks and more particularly to a method of improving learning abilities in neural networks.

BACKGROUND OF THE INVENTION

Neural networks are known for performing pattern matching tasks. Often, neural networks are implemented, trained, and then used. The implementation takes into account an estimate of an effective design for the network. The implemented network is fixed before training begins and may suffer limitations inherent in the implementation. These limitations may be obvious once training is complete or may remain unnoticed because improvements are not anticipated.

Training a neural network involves providing it a plurality of inputs and providing a correct output for each input or verifying the network's solution for each input until a reasonable level of certainty is achieved. Often this involves introducing the network to a very broad range of potential inputs before a network achieves a useful level of accuracy.

By contrast, human pattern recognition capabilities certainly did not develop through an exhaustive search of all possible feature sets, nor are they ineffective in a dynamic environment. Evolution played some role in predisposing the system toward a particular solution. Learning, in the form of interaction with the environment and inputs to a system, enables the emergence of particular solutions—both general and specific.

In modern intelligent systems design, a goal is to specify, design and implement systems that have a high degree of machine intelligence. Machine intelligence can be defined as an ability to emulate or to duplicate the sensory processing and decision making capabilities of human beings in computers. Intelligent systems need the ability to autonomously learn and adapt in uncertain or partially known environments if they are to gain commercial acceptance. A major difficulty in designing computer systems capable of intelligent behaviour is the great variability of the inputs which are to be processed and the complexity of the relationships to be learned. Different approaches have been utilised that either take advantage of one particular methodology or exploit the complimentary properties of several techniques to achieve a common goal.

The artificial neural network (ANN) approach to machine intelligence is centred upon the study of the brain and its emergent properties. Traditional artificial intelligence (AI) paradigms use dedicated symbols (local representation) to represent each concept and these symbols are manipulated by chains of inferences or rules, usually under centralised control. Artificial neural network systems, using distributed representations, reach their conclusions by applying evaluative rules to numerical values. They evolve and/or specialise during learning in a manner which is often difficult for a human observer to predict or understand.

Artificial neural networks are systems constructed to make use of some of the organisational principles that are believed to be used by the brain. In the generic neural network or connectionist model, there are three main components: the neuron, the network topology and the learning algorithm or strategy.

The neurons or processing elements (PEs) are the components where most, if not all, of the computation is done in most ANN systems. The PEs receive inputs from other PEs or from an environment via synapses or interconnections which can be excitatory or inhibitory. If the input to the PE is excitatory then it is more likely that it will pass this message or action potential to the other PEs to which it is connected. Obviously, inhibitory inputs act in the opposite manner. These inputs can be formulated as an input vector $$A=(a_i, \ldots, a_i, \ldots, a_n)$$

where $a_i$ is the activity level of an ith PE or input. Associated with each connected pair of PEs is an adjustable value or weight. The weights connected to a PE can be expressed as a vector of the form, $$W_j=(W_{1j}, \ldots, W_{ij}, \ldots, W_{nj})$$

where a value $w_{ij}$ represents the connection strength from a PE $a_i$ to another PE $a_j$. A neuron contains an internal potential limit and when this exceeds a threshold, it can propagate any action potential down its connections to other neurons. Many neurons can be active simultaneously and thus neural networks can be considered to be parallel computational systems. The internal threshold value $\Theta_j$ is modulated by weights that are associated with PE inputs. The output value of a PE can thus be defined as:

$$f\left( \sum_{i=1}^{n} a_i w_{ij} - w_{oj}\Theta_j \right)$$

Because a PE's input domain is potentially infinite, threshold functions are used to confine the PE's output to a pre-specified range or value.

The processing elements of an artificial neural network are connected together and overall system behaviour is determined by the structure and strengths of these connections. A network structure for these elements consists of processing elements arranged in groups or layers. Multi-layer systems contain input and output PE layers that receive or emit signals to the environment and neurons which are neither, called hidden units. A layer of hidden units is referred to as a hidden layer. Hidden layers provide networks with the ability to perform non-linear mappings. They also contribute to complexity in reliably training a system. Inter-field connections or connections between PEs in different layers propagate signals in one of two ways: (1) feed-forward signals only allow information to flow along connections in one direction, while (2) feedback signals allow information to flow in either direction and/or recursively.

Learning in an artificial neural network is defined to be any change in a network's memory (weight matrix) and can be categorised as supervised or unsupervised. Unsupervised learning or self-organisation is a process that does not incorporate an external teacher and relies only upon local information and internal control strategies. Examples include Adaptive Resonance Theory and Hopfield networks. Supervised learning, which includes the perceptron, Adaline, Madaline and back-propagation, incorporates an external teacher and/or global information and includes such techniques as error-correction learning and reinforcement learning.

Error-correction learning adjusts a connection weight matrix in proportion to a difference between desired and computed values of each PE in the output layer. Reinforcement learning is a technique by which weights are reinforced for properly performed actions and punished for inappropriate ones where performance of the output layer is captured in a single scalar error value.

In a multi-layer net using supervised learning, input stimuli can be re-coded into an internal representation and outputs generated are then representative of this internal representation. This representation likely encodes all training pairs to accurately provide correct corresponding output to an input within the training set. Further, the representation will encode information that enables the network to approximate outputs for intermediate and other inputs. A network is provided with a set of example input-output pairs (a training set) and a weight matrix is modified so as to approximate the function from which the training set has been drawn. In the ideal case, the net would then generalise or produce reasonable output for input stimulation to which it has never been exposed.

The most popular technique for accomplishing this type of learning in an ANN system is the multi-layer perceptron employing back-propagation (BP) learning. It evolved from a two layer supervised ANN which provides nearest-neighbour pattern matching via the perceptron error-correction procedure. This procedure effectively works to place a hyperplane between two classes of data in an n-dimensional pattern space. It has been shown that this algorithm will find a solution for any linearly separable problem in a finite amount of time. Error back-propagation through non-linear systems has existed in variational calculus for many years. It is known in the art to apply back-propagation in the form of gradient descent to the training of multi-layered nets. Further, dynamic feedback and learning logic are known. These advances lead to back-propagation algorithms which are now well known.

One of the major reasons for the development of the back-propagation algorithm was the need to escape one of the constraints on two-layer artificial neural networks which is that similar inputs lead to similar output. But while artificial neural networks like the perceptron may have trouble with non-linear mappings, there is a guaranteed learning rule for all problems that can be solved without hidden units. Unfortunately, it is known that there is no equally powerful rule for multi-layer perceptrons.

Back-propagation consists of a three-layer perceptron with feed-forward connections from the input layer to the hidden layer and from the hidden layer to the output layer. This function-estimating ANN stores pattern pairs using a multi-layer gradient descent error-correction learning algorithm. It achieves its internal representation of the training set by minimising a cost function. The most commonly used cost function is the squared error or difference between the computed and desired output values for each output PE across all patterns in the training set.

It has been found that ANN system architectures disclosed above are very well suited to many problems. Unfortunately, accurately predicting a best ANN system architecture and learning parameters for a given problem is difficult and requires much expertise. Even with such expertise, many architectures are implemented and evaluated in order to best approximate an ideal architecture. Further, as indicated above the training of back-propagation neural networks may lead to instability. As such it would be advantageous to improve their design.

Genetic Algorithms (GAs) are comprised of basic units. Although these components may vary, the functions of these basic units remain constant. A given number of individuals (or genes) from a population (or gene pool) are chosen based on a fitness evaluation. The evaluation is comparative and results in an indication of relative fitness. Alternatively the evaluation produces a scalar result and the results are later used for comparison. Pairs of these individuals are mated (via cross-over) resulting in further individuals termed "offspring." Alternatively, other forms of population modification are employed during or between generations. The current population undergoes random alteration (called mutation) which also produces off-spring. Finally, at least some of the population is culled resulting in a next generation of individuals. The culling is performed in dependence upon the fitness criteria. The genetic algorithms' termination condition may be a certain number of generations or convergence upon a particular individual in a population.

Evolutionary strategies imitate natural evolution and act as general optimisation algorithms. An evolutionary strategy can be employed when it can be determined that one member of a population, or solution, is more suitable than another. Originally, evolution-driven optimisation was defined as the following:

1. Provide initial population;
2. Mutation:
   One or more copies are made from an original member of a population. These copies are randomly changed. The range of these changes is controlled.
3. Evaluation:
   A cost function is used to determine which individual represent the best solution to the problem.
4. Selection:
   The best individuals are selected to take the place of the worst individuals and until a termination criteria is met, the method returns to step 1.

The evolutionary strategy differs from the genetic algorithm in that mutation is the only method for creating population variation; crossover is not introduced.

OBJECT OF THE INVENTION

Thus in an attempt to overcome limitations of the prior art it is an object of the present invention to provide a method of selecting parameters for improved training of an artificial neural network system architecture.

SUMMARY OF THE INVENTION

In a first broad embodiment the invention seeks to provide a method of designing an artificial neural network wherein an output response to training is dependent upon at least a parameter value. The method involves forming a plurality of groups of individual artificial neural networks, each individual in each group having a unique parameter value. The parameter values preferably define a first broad range of values with individuals within a group being related to each other by the closeness of their parameter value. A computer is used to apply to each individual a plurality of input stimuli and their corresponding expected output responses. The output responses are then compared to a corresponding expected output response to determine the parameter value that is a "best fit." The "best fit" is determined as the parameter value of the individual that provides a closest output response to the expected output response. New parameter values are assigned to the plurality of groups of individuals based on the parameter value that is the "best fit," the newly assigned parameter values defining a second range of values. This process is repeated until an individual in a group is within a predetermined tolerance of the expected output response.

In a further broad embodiment the invention seeks to provide a method of designing an artificial neural network wherein a parameter value is determinative of training response. According to the method a population of individuals is provided and the individuals are grouped. A first range of parameter values is assigned to a first group of individuals, each individual being assigned a single unique parameter value that corresponds to a particular output response. Another range of parameter values is assigned to another group of individuals, each individual in the other group being assigned a single unique parameter value. The assignment of ranges of parameter values is performed for each remaining group, until all individuals in all groups are assigned a unique parameter value. Once the initial parameter values are assigned, a computer is used to sample the assigned individuals' output responses to input stimuli to determine if an individual's group of assigned parameter values produces an output response that is within predetermined acceptable limits. Those parameter values that produced output responses that are within the predetermined acceptable limits of the desired output response are selected and new ranges of parameter values are assigned to the groups in dependence upon those values selected. Assignment of parameter values is such that at least one of the new ranges of parameter values includes at least one of the selected values. The whole process of sampling and reassigning parameter values is repeated until a parameter value is found that yields an output response that is acceptably close. Of course, the method is also applicable to find several parameter values.

In a further broad embodiment the invention seeks to provide in a computer system having a population of back-propagation neural networks, an iterative process of finding at least a parameter that results in acceptable training. The process involves iteration of a series of steps. The steps are as follows:

grouping the individual neural networks into a plurality of groups forming the population;

assigning to each group parameter values wherein each group of the plurality of groups has a parameter value that is the same as a parameter in another group;

testing each neural network's output response for a particular input string of values, to determine choice parameter values; and, assigning new parameter values to the population of neural networks based on the choice parameter value.

In a further embodiment, the second range of values is a contracted range of values, the difference between adjacent values in the second range of values being less than the difference between adjacent values in the range of values.

An advantage of the present invention is that it facilitates learning process in back-propagation neural networks and results in networks more adaptable to the complexity of tasks.

BRIEF DESCRIPTION OF THE DRAWINGS

Exemplary embodiments of the invention will now be described in conjunction with the following drawings, in which.

DETAILED DESCRIPTION OF THE INVENTION

This invention is concerned with the improvement of back-propagation learning by dynamic manipulation of such learning parameters as learning rate and momentum. In order to provide dynamic manipulation, a set of neural networks was developed which have been evolved through the use of genetic algorithms. By combining genetic search techniques with connectionist computation, a method was developed to optimise the learning process, allowing evolution to control the essential parameters of a back-propagation neural network.

Figure 1:
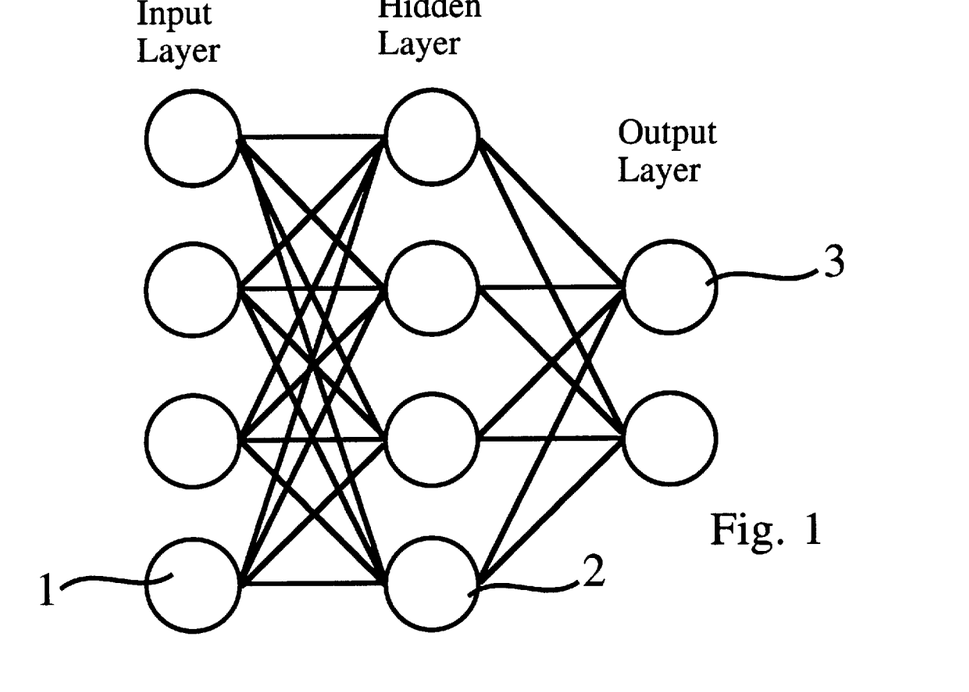
FIG. 1 is a simplified diagram of a neural network as known in the prior art and having an input layer an output layer and a single hidden layer.

Referring to FIG. 1, a neural network described in the prior art is shown having one hidden layer with four neurons 2. The neural network also has an input layer with four neurons 1 and an output layer with two neurons 3. Each layer may have any number of neurons, and the exact number is generally determined based on the desired application. Such networks are known. It is also known to have more than a single hidden layer and to limit interconnections between layers such that every neuron is not affected by and does not affect each neuron of adjacent layers.

Although artificial neural networks are classifiers capable of learning very high-order statistical correlations that are present in a training environment, and provide a powerful and attractive mechanism for generalising behaviour to novel input, they are passive classifiers working on static input. This invention provides an alternative to inefficient, purely static, learning in back-propagation neural networks. Genetic manipulation of learning parameters is used in a processing system which presents an input vector for classification purposes. A method of finding optimal parameter settings to learn the classification task without human intervention is disclosed. Such a method comprises steps for building an integrated artificial neural network/genetic algorithm system out of two distinct subsystems.

Figure 2:
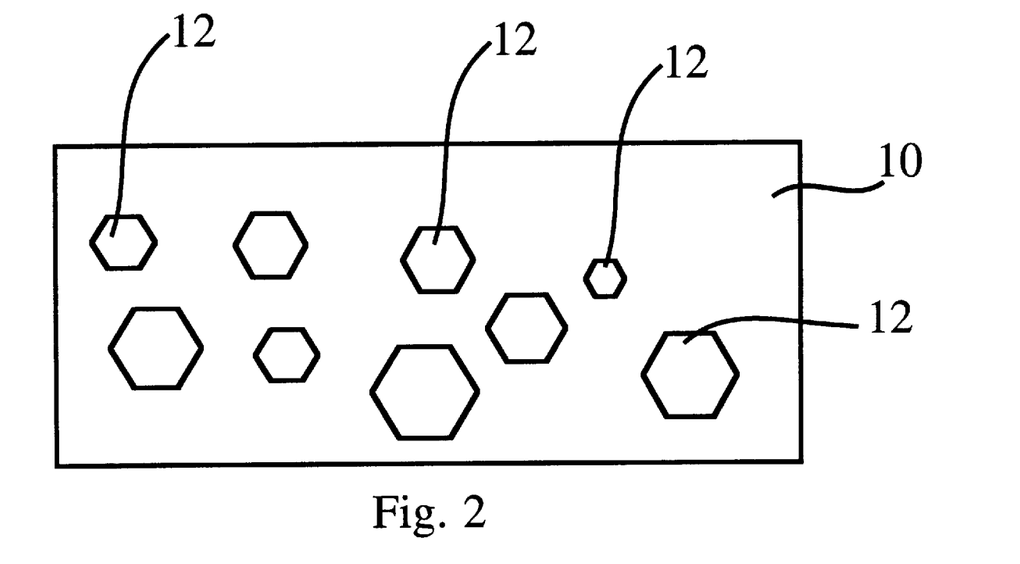
FIG. 2 is a simplified diagram of a population of hexagons that demonstrates genetic diversity.

Referring to FIG. 2, a population as is known in the prior art comprises a variety of programs for performing a function. The programs are quite different in order to provide an initial genetic diversity to the population. The present invention uses the concepts developed for genetic algorithms and applies them to improving training in artificial neural networks.

A primary subsystem comprises a series of individual artificial neural networks or sub-networks wherein the individual networks have different parameter settings and form individuals in a population. Alternatively, simulations of the networks are used to enhance performance. Following known genetic algorithm techniques, each individual artificial neural network is evaluated using predefined evaluation criteria. An example of criteria for supervised artificial neural network evaluation is a distance between the required response and the response obtained from output units. An individual, considered to be the most successful, is used to provide artificial neural network topology and/or parameter settings for all individuals in a subsequent generation.

Alternatively, a primary subsystem comprises a series of individual artificial neural networks, network simulations, or sub-networks wherein the individual networks have different parameter settings and form individuals in groups within a population. Each group within a generation is assigned a range of values for a particular parameter, in the form of learning rate. In modifying a population between generations groups of individuals are evaluated and propagated substantially independent of other groups. The method employs crossover and mutation for reproduction. Alternatively, the method employs "cloning" of successful individuals. A second subsystem performs an evaluation of individual artificial neural networks using a predetermined test set and using an evaluation criteria in the form of a distance between a required response and an obtained response. An individual that is considered to be the most successful is used to provide an artificial neural network topology for all individuals in a subsequent generation within the individual's group. Alternatively, the most successful individual is used to provide an artificial neural network topology for all individuals in a subsequent generation.

Figure 3:
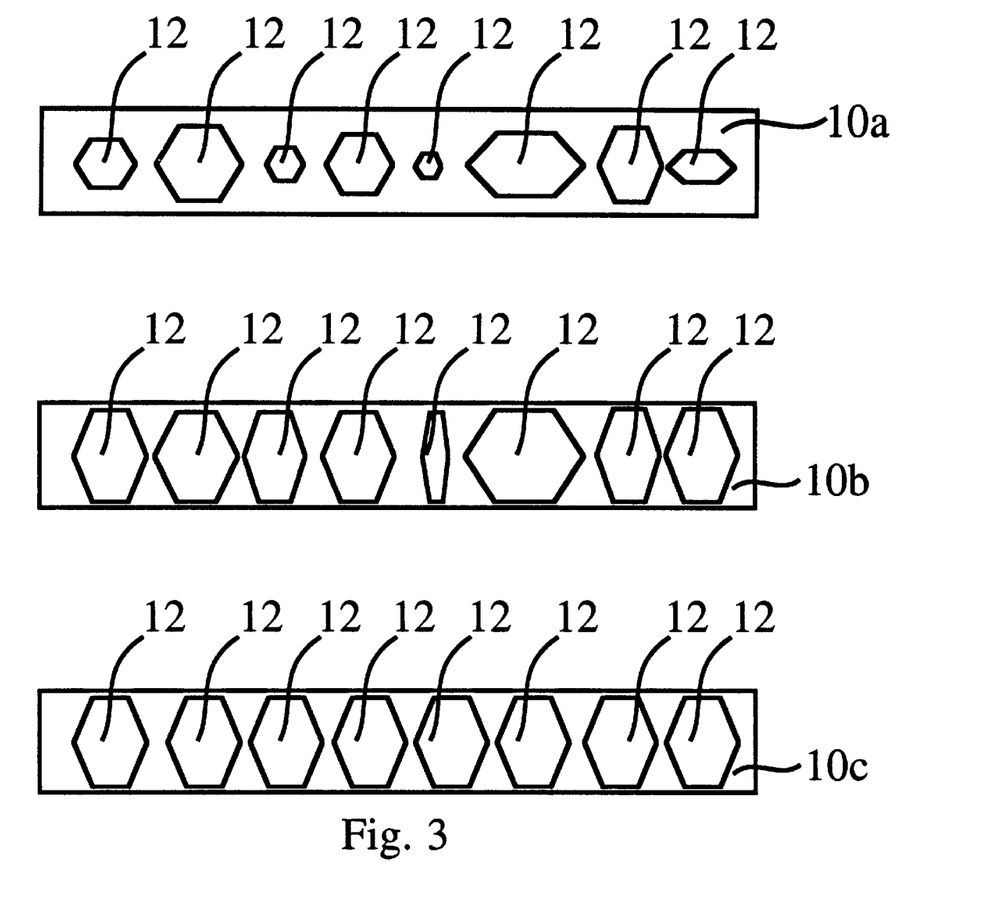
FIG. 3 is a simplified diagram of three generations of a population undergoing changes toward a convergent result.

Referring now to FIG. 3, a series of populations as formed through the use of genetic algorithms as known in the prior art are shown. The first generation 10a has genetic diversity with every individual 12 being substantially different. As we approach an intermediate generation, the genetic diversity is reduced. In the example of FIG. 3, the heights of each individual hexagon are substantially equivalent. Often by this point, an acceptable individual has been generated and an algorithm stops. When a genetic algorithm is allowed to run its course, the algorithm optimally converges upon a "good solution." Such is not always the case. Some genetic algorithms are designed not to converge. Those algorithms can be employed with the present invention as well.

In the design of neural networks, genetic algorithms have been used to determine input selections. When "real world" data is required as an input to a neural network, it is often cost effective to reduce the amount of information required to generate an adequate result. As such, genetic algorithms are used to solve populations of neural networks to determine what minimum combination of inputs results in an adequate network. A similar use of genetic algorithms can be used to determine a minimum set of outputs where said outputs are an input to another system. The use of genetic algorithms with neural networks in the prior art has been restricted to evaluating networks that were fixed for use with a variety of potential training sets or real world data. The networks were known and the genetic algorithms use was confined to fitting a known network and available data to a task in a near optimal fashion.

Figure 4:
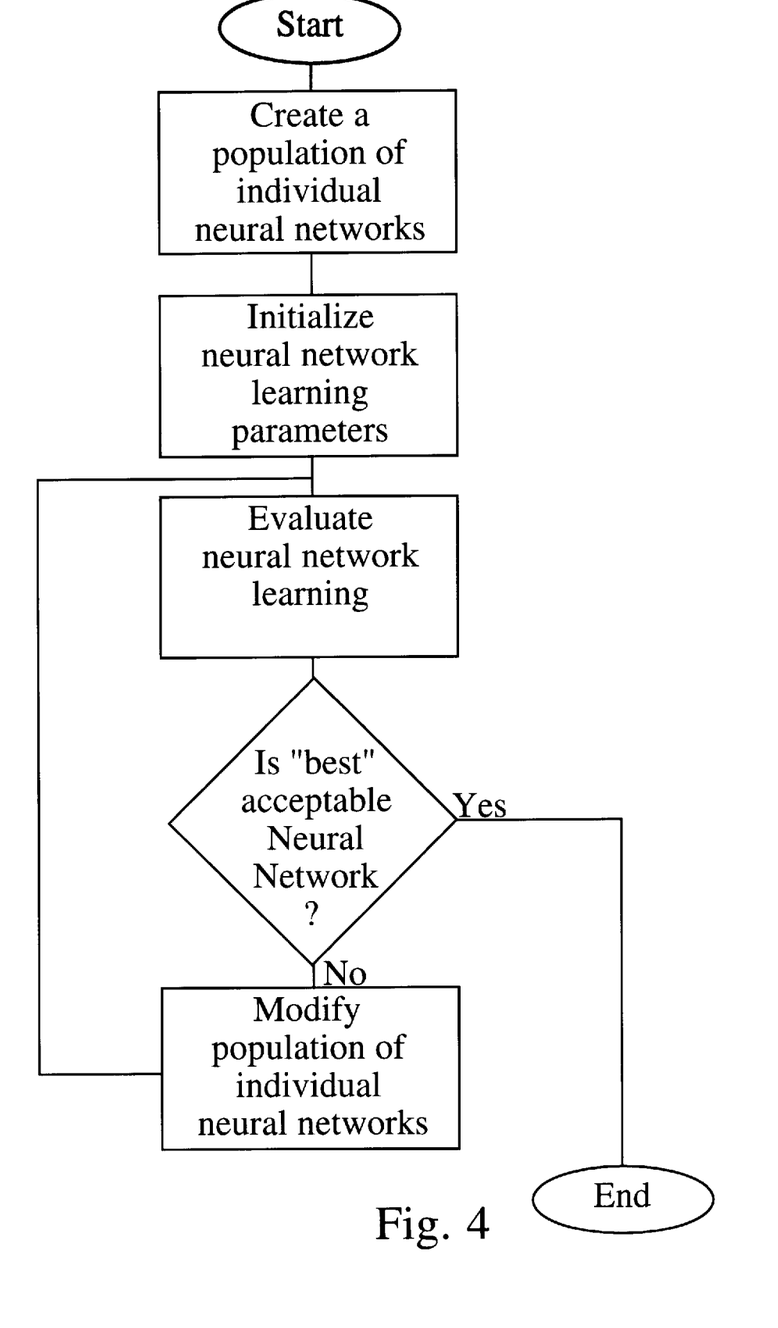
FIG. 4 is a flow chart showing a process for evolving learning parameters of an artificial neural network using a genetic algorithm.

Referring to FIG. 4, a flow diagram of a method according to the present invention is shown. A population is generated comprising a plurality of individual neural networks having a known architecture. The population size is determined in dependence upon the complexity of the networks, the range of acceptable networks to be generated, and the available computation time. Larger populations require more time but allow for a more exhaustive search of possibilities. Thus, for more complex networks, a larger population may result in generation of more desirable networks.

Each individual is provided with a unique parameter value. Such a parameter is selected to affect training within the network. Such a value is selected to provide genetic diversity among the population. It is preferable that the selection of parameter values be performed in dependence upon the genetic algorithm employed in order to improve a likelihood for convergence and to improve any results. Alternatively, the parameter values may be determined randomly. Further alternatively, the parameter values may be predetermined based on designer estimation or another non-random or pseudo-random approach.

The remainder of the method is performed iteratively. Each iteration is termed a generation. The final step in each generation involves altering the population or the parameter values in order to provide a difference in subsequent generations. In some embodiments, a generation counter is initialised at the outset and incremented through each iteration. Such a generation counter is employed for evaluation purposes. Alternatively, such a generation counter is used to halt the method when convergence does not occur within a predetermined number of generations. Further alternatively, the generation counter is used to affect the method of evaluating learning ability, method of altering the population, the method of selecting at least a best network, or a population size or diversity.

The individuals are evaluated to determine training requirements and learning ability. A sample training is performed comprising training each individual with the same values. The learning ability is determined in dependence upon a desired characteristic for the network to be generated. This learning requirement is known. Alternatively, learning is evaluated based on a set of training values or sample training values that are applied to each individual. The set may be randomly selected from or a subset of existing training values. Learning ability is evaluated by comparing the accuracy of each individual in assessing at least an input once the sample training is complete.

Alternatively, each network can be trained with different values in a fashion that statistically does not favour any particular individual. Further alternatively, the individuals may be trained in a fashion that does favour some either randomly chosen or predetermined.

At least the individual with the most desirable learning ability from the population is selected as at least a best network. When the at least a best network has a learning ability that is within a predetermined range, when the population has converged, or when the population has undergone a predetermined maximum number of generations, an individual from the at least a best network is selected as the desired network and is output or indicated in some fashion. Alternatively, when a subset of a network is being generated, an entire network is generated based on the selected individual.

When an individual from the at least a best network is not selected as the desired network, the parameters of at least some of the individuals within the population are varied. Such variations are conducted using methods known for genetic algorithms. Alternatively, parameter values of each member of the population are varied in dependence upon the parameter value of the at least a best network within the generation. The resulting population is then used as a population for a subsequent iteration (or generation). When used, the generation counting mechanism is incremented.

Figure 5:
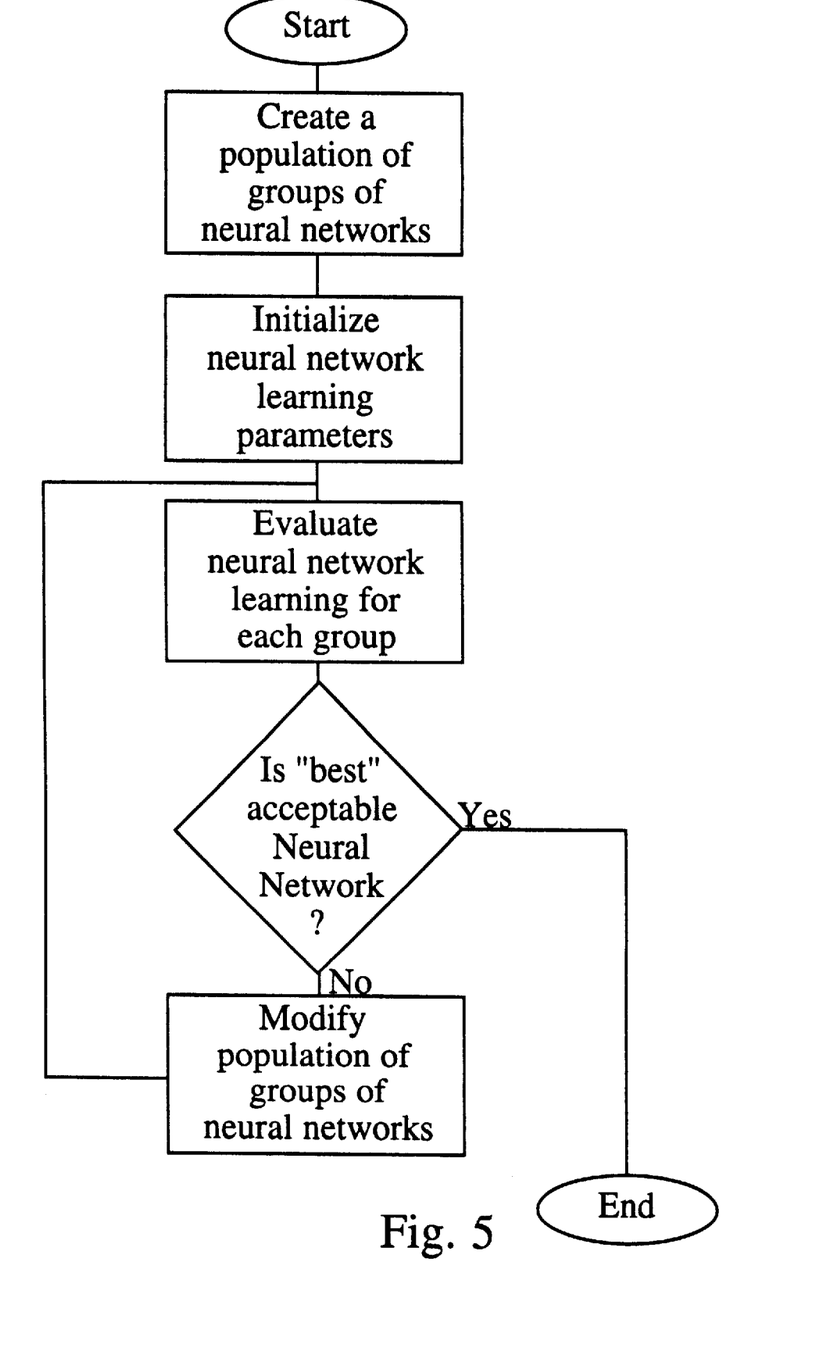
FIG. 5 is a flow chart showing a process for evolving learning parameters of an artificial neural network using a genetic algorithm and a population subdivided into groups.

Referring to FIG. 5, a flow diagram of an alternative method according to the present invention is shown. A population is generated comprising a plurality of groups or sub-populations comprising individual neural networks having a known architecture. Group size is predetermined and need not be constant. Group size may vary from group to group, from generation to generation, or both.

Each individual is provided with a unique parameter value. Such a parameter is selected to affect training within the network. The value is selected to provide genetic diversity among the population of each group. Parameter values are selected in a similar fashion to that set out for a general population. The method of using groups is also performed iteratively but differs in the step of changing the population.

Once at least a best network is selected the at least a group to which it is associated is identified. Parameter values in each group are modified in dependence upon the parameter values in groups containing the at least a best network. Alternatively, parameter values in each group are modified in dependence upon a best network determined for each group. Further alternatively, parameter values for all individuals are modified in dependence upon the at least a best network such that each group is provided a range about the parameter values of the at least a best network's. Alternatively, individuals are allowed to migrate from one group to another in order to improve genetic diversity. Alternatively, a combination of population modification methods is employed. Further alternatively, the combination of population modification methods is varied at predetermined generations. The resulting population is then used as a population for a subsequent iteration (or generation).

An example will illustrate the method of the invention using a population containing groups of individuals. Consider a population of three groups, each of which has three individuals. Each individual within a group has a learning rate within a range that has been assigned to that group. All the individuals are given the same ANN topology and training set and proceed with their training. After a predetermined amount of training, all individuals are evaluated and it is determined how successful each individual ANN is at evaluating a test set. This defines a fitness measure for an individual. It is determined which individual is best.

If more than one individual is best and has a top fitness measure (lowest error measure) then the individual which is chosen for propagation is chosen on a random basis to avoid any biasing effect. Each generation in the method is performed following a same method. A topology (weight values) of the best individual is distributed to all of the other individuals as the basis for the next generation of ANN training. Statistics are maintained as to which group contained best individuals for each Generation.

After a group has demonstrated that it consistently has a best individual, a regrouping process takes place. All of the groups overlap at their boundaries so that an entire range is presented. The statistics show where within a group's range a best individual falls. When the best individual's parameter value is in the middle of the group's range, then the regrouping consists of dividing the group into two groups which represent a greater number of individuals within the same range as the original single group—this provides fine-tuning. When the best individual's parameter value is on a boundary then a new group is created which has a range of values outside of the original group's range. This allows for the system to expand its search space. The number of groups is kept constant so regrouping eliminates a less successful group from the population and preferably eliminates the least successful group.

The above method is efficient in concentrating the attention of the evolutive method to appropriate values for the learning rate at any stage of artificial neural network training. It quickly expands a search space when original ranges of groups are insufficient for near optimal performance, and allows fine-tuning of as artificial neural network system.

Alternatively architecture is determined based on a parameter value associated with each individual. In this embodiment, a network architecture is generated for each individual in dependence upon a parameter value. The networks are then evaluated and, using an iterative or generational approach, those networks that evaluate less well are modified or discarded to improve the evaluation results for subsequent generations.

Alternatively, populations are regenerated each generation in dependence upon at least a best individual network. The method necessarily further involves the step of generating each individual network prior to evaluating a learning ability for same.

Experiments with dynamic adaptation of a single learning parameter have demonstrated an ability on the part of the method according to this invention to adjust a learning rate of a neural network to a near optimal level for each stage of a learning process. The method acts as an adaptive controller for this single parameter.

An initial high learning rate which is lower over time is an effective strategy for many artificial neural networks. Often, when an abnormally high learning rate at the start of learning drives the method quickly to good performance, the alternative method using groups is employed to drop the learning rate to a more normal level for fine-tuning. Since artificial neural network performance is determined by the structure of a problem's data set and a topology of a chosen net, the method according to the present invention is extremely adaptive in the single parameter case.

For the preliminary testing of the method according to the present invention, a cloning technique was used. The cloning technique is well known in the art of genetic algorithms. Each test used a different number of groups with a different number of individuals. Each individual within a group began with a learning rate within a range assigned to the group.

Figure 6:
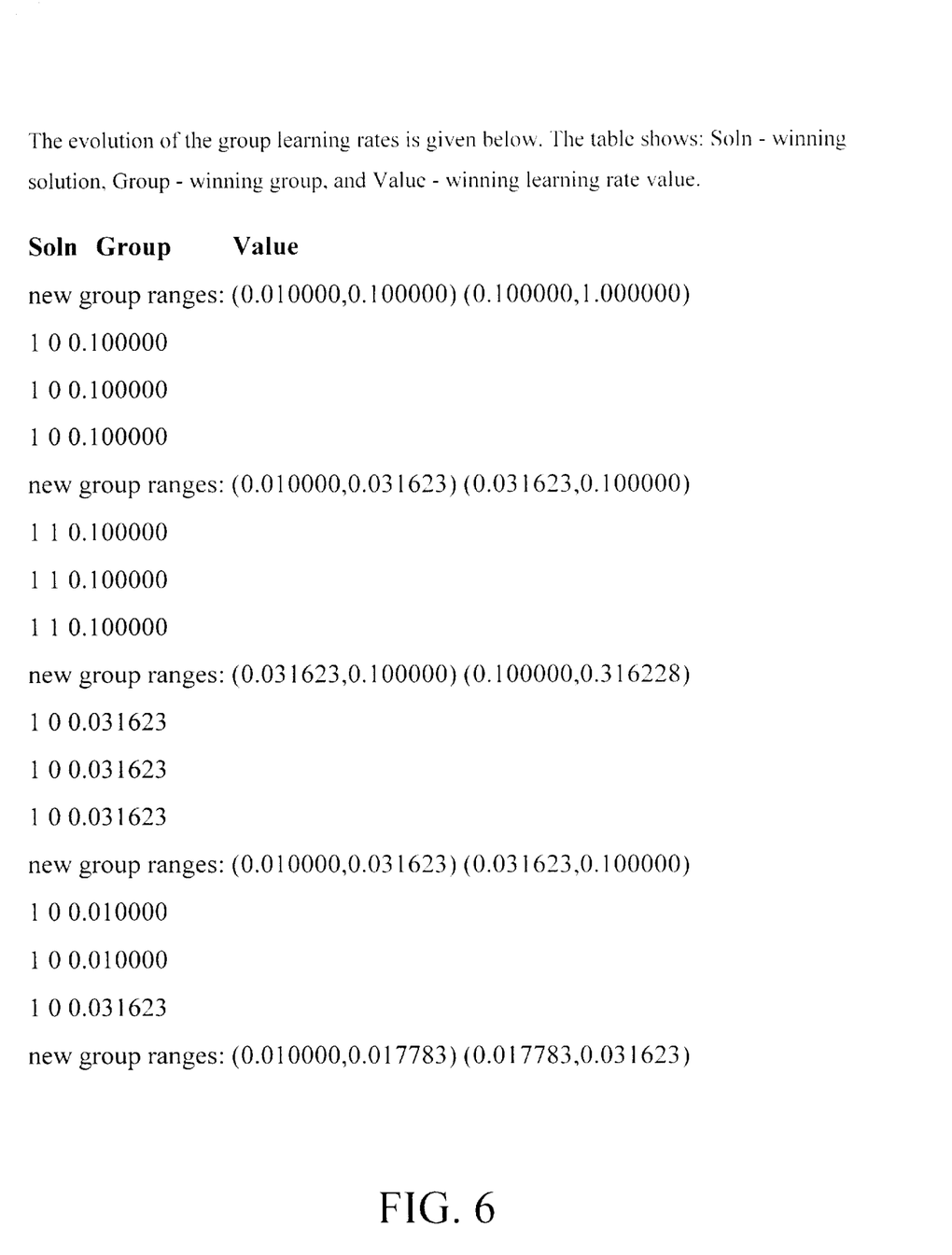
FIG. 6 is a table showing experimental results for an application of the method according to the invention for evolving learning rate in an artificial neural network and using only two groups of learning rates.

Referring to FIG. 6, a table of results from successive generations using an embodiment of the invention are presented. In experiments conducted and from which the results were taken, when more than one individual had a top fitness measure (lowest error measure), the individual chosen for propagation was chosen on a random basis to avoid any biasing effect. While this cloning version of a method according to the invention only used a static set of learning rates, the sequence of rate changes demonstrated an adaptation on the part of the system.

The results of further testing show that a multi-parameter system performs in a similar fashion to a single parameter system. The method of the invention using populations containing groups of individuals appears to function in a manner similar to the single parameter case, though at a more conservative pace, while still maintaining a manageable number of groups and individuals. Since the evolutionary strategy method relies only on "mutation" within a pre-determined range, this method is very good for fine-tuning systems where approximate values are known for some of the parameters, and where appropriate values are not known.

Numerous other embodiments may be envisaged without departing from the spirit and scope of the invention.

What I claim is:

1. A method of producing an artificial neural network wherein an output response to training is dependent upon at least a parameter value and for use in a computer, the method comprising the steps of:
   a) forming a plurality of groups of individual artificial neural networks, each individual in each group having a unique parameter value, the parameter values defining a first broad range of values, the individuals within a group being related to each other by the closeness of their parameter value;

b) using the computer, applying to each individual a plurality of input stimuli and their corresponding expected output responses;

c) using the computer, testing the individuals by applying to each individual at least an input stimulus and comparing at least a corresponding output response to at least a corresponding expected output response to determine the parameter value that is a best fit, wherein the best fit is assigned to the parameter value of the individual that provides a closest output response to the expected output response;

d) using the computer, assigning new parameter values to the plurality of groups of individuals based on the parameter value that is the best fit, the new parameter values defining a second range of values; and, e) repeating steps (b) to (d) until an individual in a group is within a predetermined tolerance of the at least an expected output response.

2. A method of producing an artificial neural network as defined in claim 1, wherein each group of the plurality of groups has at least one parameter value that is the same as a parameter in at least one other group.

3. A method of producing an artificial neural network as defined in claim 2, wherein the second range of values assigned in step (d) is a contracted range of values including a segment of the range of values of the group of the most fit individual.

4. A method of producing an artificial neural network as defined in claim 2, wherein the second range of values assigned in step (d) is at least a substantially new range of values substantially outside of the range of values of the group of the most fit individual, thereby expanding the first broad range of values.

5. A method of producing an artificial neural network as defined in claim 4, wherein the second at least substantially new range of values includes the best fit value.

6. A method of producing an artificial neural network as defined in claim 1, wherein the second range of values is a contracted range of values, the difference between adjacent values in the second range of values being less than the difference between adjacent values in the range of values.

7. A method of producing an artificial neural network as defined in claim 1, wherein the new parameter values comprise at least the best fit parameter value.

8. A method of producing an artificial neural network wherein a parameter value is determinative of training response, the method comprising the steps of:

a) providing a population of individuals;

b) grouping individuals into groups of individuals;

c) assigning a first range of parameter values to a first group of individuals, each individual being assigned a single unique parameter value that corresponds to a particular output response;

d) assigning another range of parameter values to another group of individuals, each individual in the other group being assigned a single unique parameter value;

e) repeating step (d) for all other groups, until all individuals in all groups are assigned a unique parameter value;

f) using a computer, testing, by sampling the assigned individuals' output responses to determine if an individual's group of assigned parameter values produced an output response that is within predetermined acceptable limits;

g) using a computer, selecting those parameter values that produced output responses that are within the predetermined acceptable limits of the desired output response;

h) using a computer, assigning new ranges of parameter values to the groups in dependence upon those values determined to be acceptable in step (g), at least one of the new ranges of parameter values including at least one of the values determined to be within acceptable limits; and, i) repeating steps (f) to (h) until a parameter value is found that yields an output response that is acceptably close.

9. A method of producing an artificial neural network as defined in claim 8, wherein each group's new range assigned in step (g) is one of an expanded range, a narrower range and a contracted range of values, a contracted range of values being defined as having a higher resolution than its previous range of values.

10. In a computer system having a population of back-propagation neural networks comprising a plurality of groups of individual neural networks, an iterative process of finding at least a parameter that results in acceptable training, said process comprising iterations of a series of steps, each iteration comprising the steps of:

a) testing each neural network within the population to determine a choice at least a parameter value, wherein the choice at least a parameter value is at least a parameter value of a neural network that provides a closest response to a desired output response for a particular input string of values and wherein each group has at least one parameter value that is the same as a parameter value in at least one other group; and, b) assigning new parameter values to the population of neural networks in dependence upon the choice at least a parameter value, the new parameter values defining a second range of values that more closely approximates the desired output response, wherein the second range of values is at least a substantially new range of values substantially outside of the range of values of the group of the most fit individual, thereby expanding the first broad range of values.

11. A process as defined in claim 10, wherein the second at least substantially new range of values includes the best fit value.

* * * * *